United States Patent [19]

Spease et al.

[11] Patent Number: 4,590,819
[45] Date of Patent: May 27, 1986

[54] MOTION TRANSMITTING REMOTE CONTROL ASSEMBLY MOLDED TERMINAL CONNECTOR

[75] Inventors: Arthur L. Spease, Livonia; Holly Walston, Utica, both of Mich.

[73] Assignee: Teleflex Incorporated, Limerick, Pa.

[21] Appl. No.: 712,614

[22] Filed: Mar. 18, 1985

Related U.S. Application Data

[63] Continuation of Ser. No. 392,764, Jun. 28, 1982, abandoned.

[51] Int. Cl.⁴ ............................................. F16C 1/14
[52] U.S. Cl. .............................. 74/501 R; 74/501 P; 74/502; 403/71; 403/141; 403/122
[58] Field of Search .............. 74/501 R, 501 P, 502; 403/67, 71, 76, 141, 122, 163

[56] References Cited

U.S. PATENT DOCUMENTS

| | | | |
|---|---|---|---|
| 2,859,060 | 11/1958 | Davies et al. | 403/122 |
| 3,296,876 | 1/1967 | Fernberg | 74/501 X |
| 3,853,414 | 12/1974 | Hirano et al. | 403/71 |
| 4,111,570 | 9/1978 | Morel | 403/141 |
| 4,118,131 | 10/1978 | Schnitzius | 403/141 |
| 4,327,600 | 5/1982 | Bennett | 74/501 R |
| 4,386,949 | 6/1983 | Bassi | 403/141 |
| 4,520,689 | 6/1985 | Sucro et al. | 74/595 |

Primary Examiner—Kenneth J. Dorner
Assistant Examiner—Rodney M. Lindsey
Attorney, Agent, or Firm—Reising, Ethington, Barnard, Perry & Milton

[57] ABSTRACT

A motion transmitting remote control assembly including a conduit and a core element movably supported by the conduit and extending therefrom to provide a variable extending length of the core element between the conduit and one end of the core element. The extending length defines a line of force. An integral terminal member is disposed on the extended length for operatively interconnecting the core element to a control member to translate movement therebetween along the line of force. The terminal member includes a pocket extending therein and defining an axis perpendicular to the line of force. The pocket includes lips extending radially therein for retaining a ball pin of the control member within the pocket and is characterized by the terminal member including a plurality of slots extending radially from the axis defined by the pocket at an angle relative to the line of force.

20 Claims, 8 Drawing Figures

MOTION TRANSMITTING REMOTE CONTROL ASSEMBLY MOLDED TERMINAL CONNECTOR

This is a continuation of application Ser. No. 392,764, filed on June 28, 1982 now abandoned.

TECHNICAL FIELD

The subject invention relates to a motion transmitting remote control assembly of the type for transmitting forces along a curved path by a flexible motion transmitting core element movably supported within a guide means such as a conduit. More specifically, the instant invention relates to a terminal member disposed on the end portion of either the flexible core element or a rod member connected to a core element for providing a connection to a control member such as a lever.

BACKGROUND ART

Prior art motion transmitting remote control assemblies have included connectors for interconnecting a core element or a rod extending therefrom with a control member such as a lever. One common construction used is a terminal member disposed on the end portion of the rod or core element wherein the terminal member includes a pocket. The control member would include a ball pin. The ball portion of the ball pin is retained within the pocket of the terminal member. Such terminal members of remote control assemblies have included slots disposed through the terminal member about the pocket to provide flexibility to the pocket to allow for the insertion of the ball of the ball pin into the pocket. A problem arises when the core element or rod member extends laterally relative to the central axis of the pocket. The force applied laterally to the pocket retaining the ball pin therein flexes the pocket and often undesirably releases the ball pin from the pocket. The prior art does not provide a terminal member having a construction which could be adapted to an integral molded terminal member to allow the insertion of the ball pin member within the pocket thereof and maintain the ball pin member within the pocket during the application of a force applied laterally to the central axis of the pocket.

STATEMENT OF THE INVENTION

According to the present invention, there is provided a motion transmitting remote control assembly including guide means and core means movably supported by the guide means and extending therefrom to provide a variable extending length of the core means between the guide means and one end of the core means. The extending length defines a line of force. An integral terminal member is disposed on the extended length for operatively interconnecting the core means to a control member to translate movement therebetween along the line of force. The terminal member includes a pocket extending therein and defining an axis perpendicular to the line of force. The pocket includes retaining means for retaining a control member within the pocket. The assembly is characterized by the terminal member including a plurality of slots extending radially from the axis at an angle relative to the line of force.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
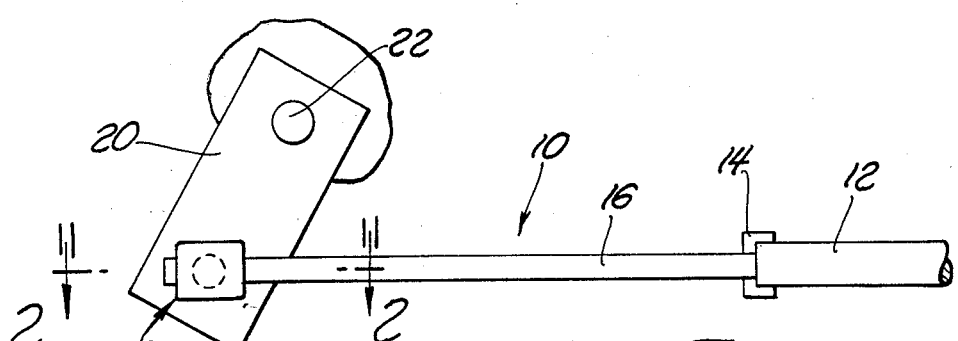
FIG. 1 is an elevational side view of a motion transmitting remote control assembly connected to a control member by a terminal member constructed in accordance with the instant invention.

A motion transmitting remote control assembly of the type for transmitting motion in a curved path is generally shown at 10 in FIGS. 1 through 4. As shown in FIG. 1, the assembly 10 includes guide means comprising a conduit 12 and a wiper member 14 secured to the end of the conduit 12 for preventing foreign matter, such as dust, from entering the conduit 12. The conduit 12 may be a rigid tube member connected to the end of a flexible conduit or may be a flexible conduit of the type well known in the art. The assembly 10 further includes core means movably supported by the conduit 12 and extending therefrom to provide a variable extending length of the core means between the guide means 12 and one end of the core means. The core means includes a core element supported for movement along a curved path and a rod member 16 fixedly connected to the end of the core element. The rod member 16 is supported within the tube member 12 for reciprocal movement therethrough so as to provide the variable extending length of the rod member 16 between the wiper 14, or end of the conduit 12 of the guide means, and the distal end of the rod member 16. By reciprocating into and out of the conduit 12, the extending length of the rod member 16 defines a line of force. The assembly further includes an integral terminal member generally indicated at 18 disposed on the extended length of the rod member 16 for operatively interconnecting the rod member 16 and adjoining the core element to a control member 20 to translate movement therebetween along the line of force defined by the rod member 16.

As shown in FIG. 1, the control member 20 may be a lever. The control member 20 is generally supported upon a rotatable actuating shaft 22 whereby, upon longitudinal movement of the rod member 16 along the line of force, the control member 20 is rotated which, in turn rotates the shaft 22. Since the control member swings about the shaft 22, the shaft 22 functions as a pivot point. Accordingly, the terminal member 18 travels along an arc. Hence, the line of force defined by the extending length of the rod 16 is constantly linear relative to the terminal member 18, but only instantaneously linear relative to the swinging control member 20. Thusly, linear movement of a core element supported by the conduit 12 can be translated from the attached rod member 16 through the terminal member 18 to the lever 20 to actuate pivoting movement of the shaft 22. Alternatively, the shaft 22 and lever 20 can function as the actuator to actuate movement of the rod 16 and core element attached thereto.

Figure 4:
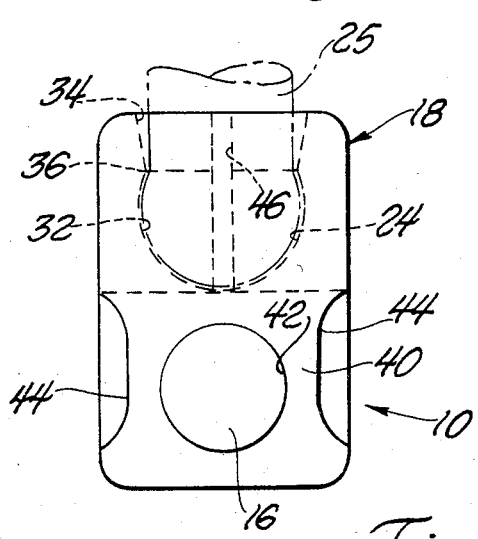
FIG. 4 is an end view taken substantially along lines 4—4 of FIG. 2.
Figure 5:
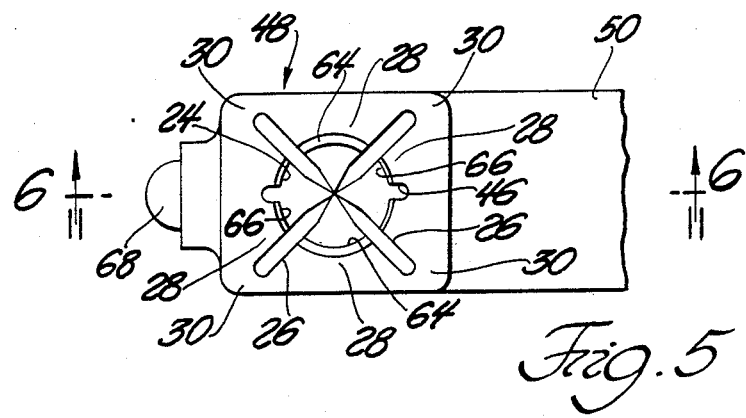
FIG. 5 is a fragmentary plan view of a second embodiment of the instant invention.
Figure 6:
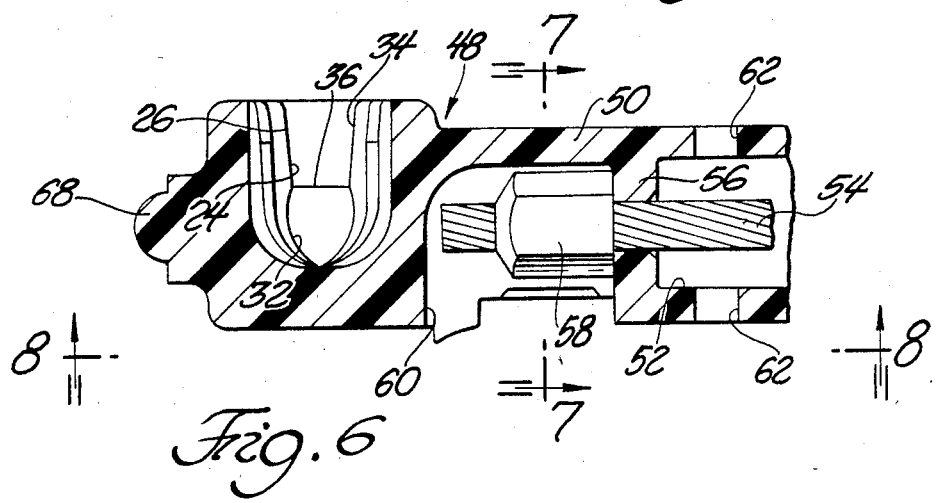
FIG. 6 is a fragmentary side elevational view taken substantially along lines 6—6 of FIG. 5.
Figure 7:
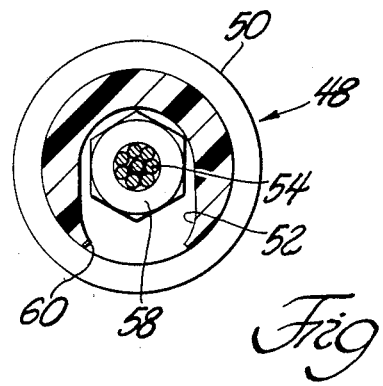
FIG. 7 is a cross-sectional view taken substantially along lines 7—7 of FIG. 6.
Figure 8:
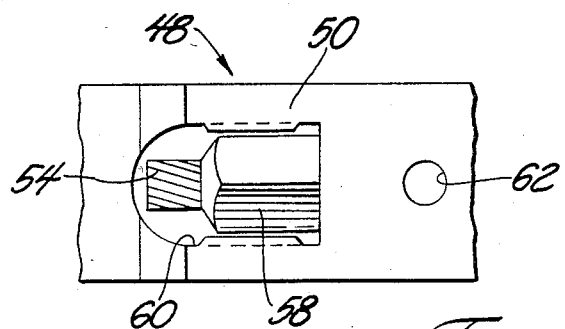
FIG. 8 is a fragmentary plan view taken substantially along lines 8—8 of FIG. 6.

The terminal member 18 includes a cup shaped pocket 24 extending therein and defining an axis which is perpendicular to the line of force defined by the extending length of the rod 16. The pocket 24 includes retaining means for retaining a portion of the control member 20 within the pocket 24. More specifically, the control member 20 includes a ball pin 25 extending therefrom, the retaining means of the pocket 24 retaining the ball portion of the ball pin 25 within the pocket 24, as shown in FIG. 4. The assembly 10 is characterized by the terminal member 18 including a plurality of slots 26 extending radially from the axis defined by the pocket 24 and at an angle relative to the line of force defined by the extending portion of the rod 16. The terminal member 18 includes four slots 26, each of the slots 26 being disposed at an angle of about 45° relative to the line of force defined by the extending portion of rod member 16. Alternatively, each of the slots may be disposed at any angle, preferably acute, relative to the line of force. This configuration provides sufficient strength to the intergal terminal member 18 so that the ball portion of the ball pin 25 extending from the control member 20 may be inserted into the pocket 24 and retained therein during movement of the terminal member 18 along the line of force and not be inadvertently displaced from the pocket during movement of the rod member 16 and control member 20.

Figure 3:
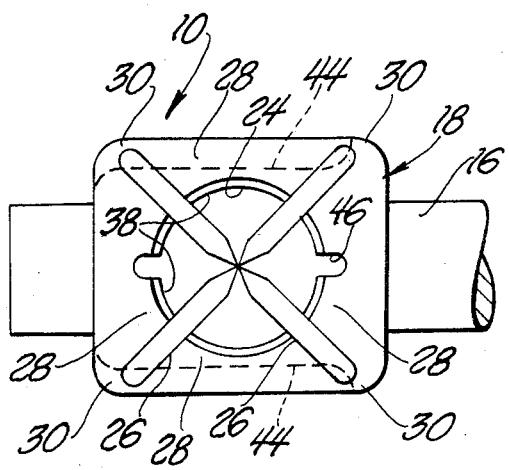
FIG. 3 is a plan view taken substantially along lines 3—3 of FIG. 2.

The slots 26 divide the terminal member 18 into four intermediary portions 28, as shown in FIG. 3. The intermediary portions 28 are disposed between each pair of slots 26 about the pocket 24. The terminal member 18 includes restraining means for restraining the outward flexure of the intermediary portions 28. The outward flexure of the intermediate portions 28 is created by the lateral movement of the terminal member 18 against the ball portion of the ball pin 25 extending from the control member 20 as the extending portion of the rod member 16 reciprocally moves into and out of the conduit 12. The restraining means includes an edge portion 30 of the terminal member 18 located at the peripheral end of each of the slots 26 and interconnecting each of the intermediate portions 28 directly adjacent to each of the slots 26 whereby the peripheral end of each of the slots 26 is spaced from the outer surface of the terminal member 18. In other words, the terminal member 18 includes integral restraining means which interconnects the intermediate portions 28 about the slots 26. Accordingly, the terminal member 18 has sufficiently inherent flexibility created by the slots 26 to allow for the insertion of the ball pin 25 into the pocket 24 while also including restraining means for preventing the inadvertent release of the ball pin 25 from the pocket 24 during movement of the terminal member 18 as actuated by the rod member 16 and core element connected thereto or by actuation of the control member 20.

Figure 2:
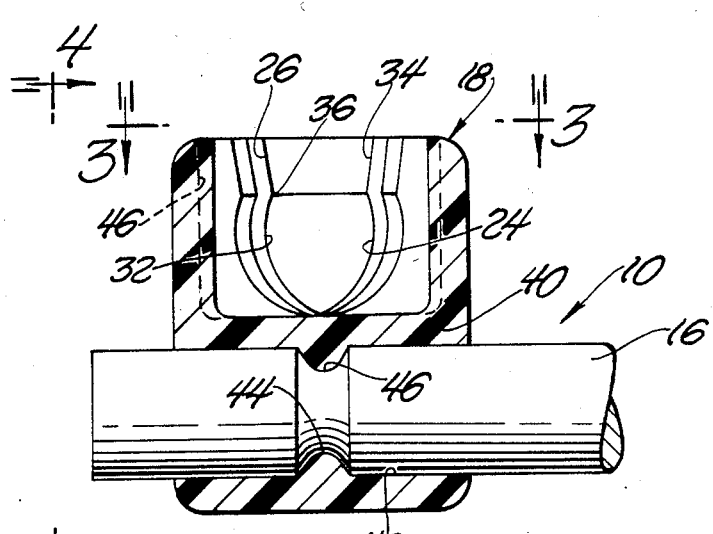
FIG. 2 is a cross-sectional view taken substantially along lines 2—2 of FIG. 1.

The pocket 24 includes an interior hemispherical portion 32 and a frustoconical portion 34 extending outwardly therefrom. A circumferential portion 36 is defined therebetween, as shown in FIGS. 2 and 4. As shown in FIG. 3, the retaining means for retaining the ball pin 25 of the control member 20 within the pocket 24 includes a lip 38 extending radially inwardly from the circumferential portion 36 of each of the intermediate portions 28. The lips 38 extend between each of the slots 26. The restraining means 30 provides sufficient rigidity to the terminal member 18 so that the lips 38 retain the ball portion of the ball pin 25 within the pocket 24 and the slots 26 provide sufficient flexure to the terminal member 18 so that the ball pin 25 may be removed from the pocket 24.

The terminal member 18 includes a body portion 40 disposed below the pocket 24 along the axis defined by the pocket 24. The body portion 40 includes a bore 42 therethrough extending longitudinally along the line of force and having an annular projection 44 extending radially into the bore 42 for engaging the rod member 16. The rod member 16 includes an annular recess 45, the projection 44 engaging the recess 46. Generally, the terminal member 18 is molded about the rod member 16 to be fixedly secured thereto. However, the terminal member 18 may be molded about the rod member 16 so as to allow rotation of the terminal member 18 about the rod member 16. In this manner, the terminal member 18 can be adapted to various orientations of a fixed control member 20 so as not to require an adapter when the control member is not initially oriented.

The body portion 40 further includes recessed portions 44 extending longitudinally along the outer side walls thereof, as shown in FIG. 4. The recessed portions 44 provide means for retaining the molded terminal member 18 within a female mold during the removal of the male mold half therefrom. More specifically, during the molding process of the terminal member 18, a male projection defines the pocket 24, the terminal member 18 being molded thereabout. Upon separation of the mold halves, the female mold half engages the recesses 44 of the body portion 40 of the terminal member 18 to retain the terminal member 18 within the female mold half as the male projection from the other mold half is removed from the pocket 24.

The terminal member 18 includes a radial groove 46 in the interior of the pocket 24 disposed on the line of force defined by the rod member 16. The groove 46 provides means for receiving the flash of typically used zinc die-cast ball pins 25. Additionally, the groove 46 provides a decreased bearing area within the pocket 24 whereby the retained ball pin 25 compresses the material of the terminal 18 within the pocket 24 during actuation thereof to relieve stresses within the terminal 18. If the pocket provides a loose fit about the ball pin 25, the groove 46 is used to retain grease, thereby providing a means for lubricating the surfaces between the pocket 24 and ball pin 25 of the control member 20.

Upon continuous use of the terminal member 18 or under unexpected high loads along the line of force, an intermediary portion 28 of the terminal member 18 may be broken off from the terminal member 18. The terminal member 18 may still be salvaged by the use of a clip disposed about the terminal member 18 so as to retain the ball pin 25 of the control member 20 within the pocket 24. The clip can be retained on the terminal member 18 by engaging the recessed portions 44 and extending over the pocket 24.

A second embodiment of the instant invention is generally shown at 48 in FIGS. 5-8. Like numbers designate like structure already been described in FIGS. 1-4.

The terminal member 48 includes a neck portion 50 which extends along the line of force radially relative to the pocket 24. The neck portion 50 includes a bore 52. The core means includes a cable 54 defining the extended length thereof, the cable 54 being fixedly secured within the bore 52. More specifically, the neck portion 50 includes an annular flange 56 projecting radially inwardly into the bore 52. A stake member 58 is clamped or otherwise fixedly secured to the end portion of the cable 54, the annular flange 56 retaining the stake 58 within the neck portion 50 of the terminal member 48. The neck portion 50 further includes an opening 60 into the bore 52 and beyond the annular flange 56. A pair of oppositely disposed openings 62 are disposed on the opposite side of the flange 56. To secure the terminal member 48 to the cable 54, the cable 54 is inserted into the terminal member 48 and located through the openings 62 so as to be inserted through the annular flange 56. The terminal 54 is then extended through the opening 50 so that the stake 58 may be clamped, brazed, soldered, or otherwise fixedly secured to the end of the cable 54. The cable 54 and stake 58 are then drawn into the bore 52 whereby the stake 58 is retained within the bore 52 by the flange 56.

The retaining means of the terminal member 48 includes two oppositely disposed lips 64, each of the lips 64 extending between two of the slots 26. The lips 64 extend radially into the pocket 24 from the laterally disposed intermediate portions 28 which are disposed laterally relative to the line of force defined by the extending length of the cable 54. The two intermediate portions 28 which across the line of force 54 include smaller lips 66 extending radially into the pocket 24. The terminal member 48 does not include a full lip on the intermediate portions 28 crossing the line of force defined by the cable member 54 because the laterally disposed neck portion 50 rigidifies the intermediate portion 28 directly adjacent thereto. This decrease in flexibility of the intermediate portion 28 directly adjacent the neck portion 50 would make removal of the ball pin 25 too difficult if a large lip extended from that intermediary portion 28. Hence, a smaller lip 66 is used.

The terminal member 48 includes an integral projection 68 extending from the end thereof. The projection 68 may be adapted to retain a clip thereon for providing an additional retaining means for retaining the ball pin within the pocket 24. Since the terminal member 48 is a molded member, the projection 68 may be molded into any desired shape to adapt the terminal member 48 for other various uses.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assembly (10) comprising: guide means (12); core means (16,54) movably supported by said guide means (12) and extending therefrom to provide a variable extending length of said core means (16,54), said extending length defining a line of force, and an integral terminal member (18,48) disposed on said extended length for operatively interconnecting said core means (16,54) and a control member (20) to translate movement therebetween along said line of force, said terminal member (18,48) including a cup-shaped pocket (24) extending therein and having a center axis perpendicular to said line of force, said pocket (24) including integral retaining means for retaining a portion of the control member (20) within said pocket (24) and characterized by said terminal member (18,48) including a plurality of slots (26) originating at said center axis and extending radially from said center axis and partially into said terminal member (18,48) at an angle relative to said line of force.

2. An assembly as set forth in claim 1 further characterized by each of said slots (26) being disposed at an acute angle relative to said line of force.

3. An assembly as set forth in claim 2 including four of said slots (26), each of said slots (26) being disposed at an angle of about 45° relative to said line of force.

4. An assembly as set forth in claim 1 further characterized by said slots (26) dividing said terminal member (18, 48) into interconnecting portions (28) disposed between each pair of said slots (26) about said pocket (26), said terminal member (18, 48) including restraining means for restraining the outward flexure of at least two of said intermediate portions (28).

5. An assembly as set forth in claim 4 further characterized by said restraining means including an edge portion (30) of said terminal member (18, 48) located at the peripheral end of each of said slots (26) and interconnecting said intermediate portions (28) directly adjacent to each of said slots (26) whereby the peripheral end of each of said slots (26) is spaced from the outer surace of said terminal member (18, 48).

6. An assembly as set forth in claim 1 further characterized by said pocket (24) including an interior hemispherical portion (32) and a frustoconical portion (34) extending outwardly therefrom and defining a circumferential portion (36) therebetween, said retaining means including a lip (38) extending radially inwardly from at least a portion of said circumferential portion (36).

7. An assembly as set forth in claim 6 further characterized by including four of said slots (26), each of said slots (26) being disposed at an angle of about 45° relative to said line of force, said lips (38) extending between each of said slots (26).

8. An assembly as set forth in claim 7 further characterized by said terminal member (18) including a body portion (40) disposed below said pocket (24) along said axis, said core means including a rod member (16), said body portion (40) including a bore (42) therethrough along said line of force and having an annular projection (44) extending radially into said bore (12) for engaging said rod member (16).

9. An assembly as set forth in claim 8 further characterized by said body portion (40) including recessed portions (44) extending longitudinally along the outer side walls thereof.

10. An assembly as set forth in claim 6 further characterized by including four of said slots (26), said retaining means including two oppositely disposed lips (64), each of said lips (64) extending between two of said slots (26).

11. An assembly as set forth in claim 10 further characterized by each of said slots (26) being disposed at an angle of about 45° relative to said line of force and defining intermediate portions (28) of said terminal member (18) between each pair of said slots (26), two opposite ones of said intermediate portions (28) crossing said line of force and two opposite ones of said intermediate portion (28) extending laterally relative to said line of force, said retaining means including a lip (64) extending radially into said pocket (24) from said laterally disposed intermediate portions (28).

12. An assembly as set forth in claim 11 further characterized by said terminal member (48) including a neck portion (50) extending along said line of force radially relative to said pocket (24), said neck portion (50) including a bore (52), said core means including a cable (54) fixedly secured within said bore (52).

13. An assembly as set forth in claim 1 further characterized by including a radialgroove (46) in the interior of said pocket (24) on said line of force.

14. An assembly as set forth in claim 3 further characterized by said slots (26) dividing said terminal member (18, 48) into intermediary portins disposed between each pair of said slots about said pocket (24), said terminal member (18, 48) including restraining means for restraining the outward flexure of said intermediary portions (28) and including an edge portion (30) of said terminal member (18, 48) located at the peripheral end of each of said slots (26) and interconnecting said intermediary portions (28) directly adjacent to each of said slots (26), the peripheral end of each of said slots (26) being spaced from the outer surface of said terminal member (18, 48), said pocket (24) including an interior hemispherical portion (32) and a frustoconical portion (34) extending outwardly therefrom and defining circumferential portion (36) therebetween, said retaining means including a lip (38, 64, 66) extending radially inwardly from at least a portion of said circumferential portion (36).

15. An assembly as set forth in claim 14 further characterized by said terminal member (18) including a body portion (40) disposed below said pocket (24) along said axis, said core means including a rod member (16), said body portion (40) including a bore (42) therethrough along said line of force and having an annular projection (44) extending radially into said bore (12) for engaging said rod member (16).

16. An assembly as set forth in claim 15 further characterized by said body portion (40) including recessed portions (44) extending longitudinally along the outer side walls thereof.

17. An assembly as set forth in claim 16 further characterized by including a groove (46) in the interior of said pocket (24) and disposed on said line of force.

18. An assembly as set forth in claim 14 further characterized by including four of said slots (26), said retaining means including two oppositely disposed lips (64), each of said lips (64) extending between two of said slots (26).

19. An assembly as set forth in claim 18 further characterized by each of said slots (26) being disposed at an angle of 45° relative to said line of force and defining intermediate portions (28) of said terminal member (18) between each pair of said slots (26), two opposite ones of said intermediate portions (28) crossing said line of force and two opposite ones of said intermediate portion (28) extending laterally relative to said line of force, said retaining means including a lip (64) extending radially into said pocket (24) from said laterally disposed intermediate portions (28).

20. An assembly as set forth in claim 19 further characterized by including a groove (46) in the interior of said pocket (24) on said line of force.

* * * * *